Jan. 1, 1946.   O. D. LUTES   2,391,910
FARMING IMPLEMENT
Filed April 24, 1944
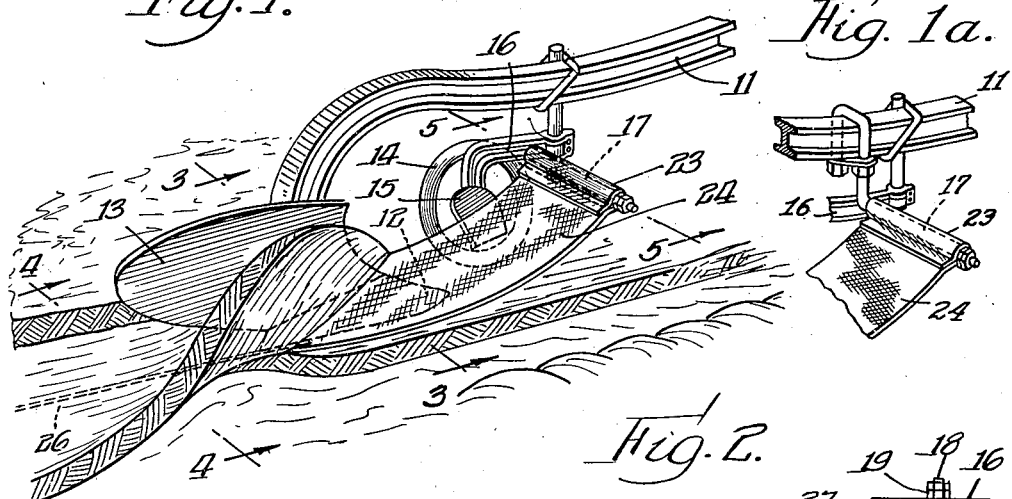
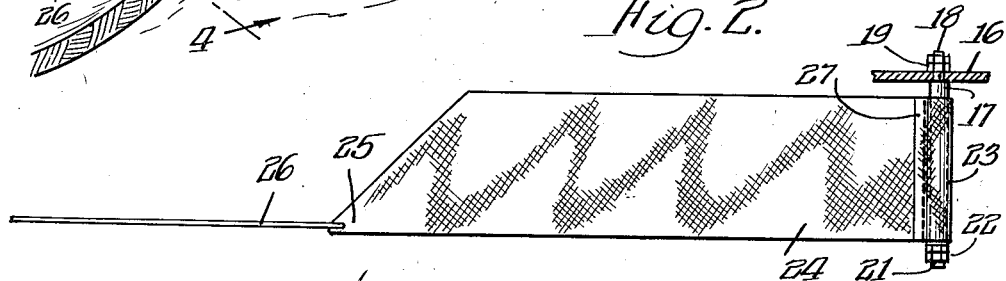
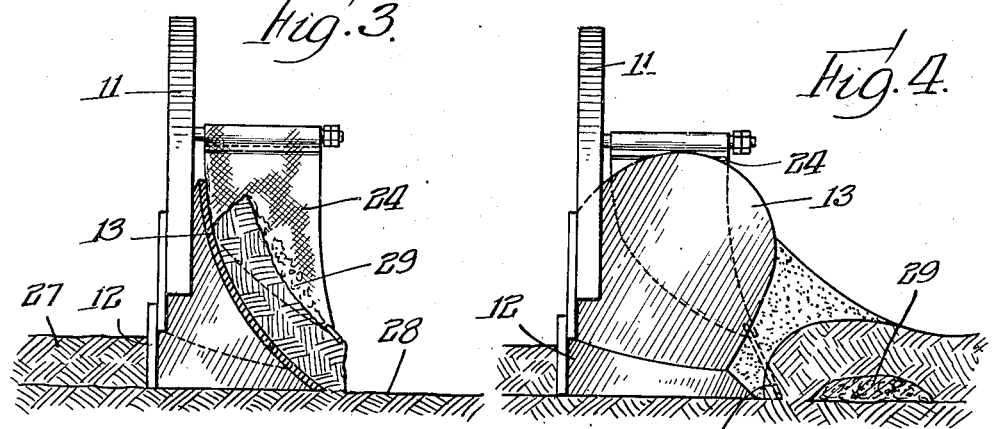
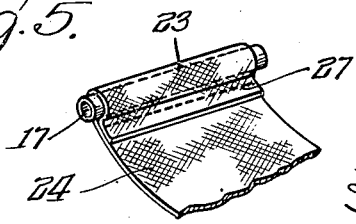
INVENTOR.
Oakley D. Lutes
By: Loftus, Moore, Olson & Trexler
attys.

Patented Jan. 1, 1946

2,391,910

UNITED STATES PATENT OFFICE 2,391,910

FARMING IMPLEMENT

Oakley D. Lutes, Jackson, Mich.

Application April 24, 1944, Serial No. 532,391

9 Claims. (Cl. 97—194)

The present invention relates to farming implements, and more particularly to an implement for use in conjunction with a plow or plow colter to insure covering trash on the ground by soil turned over by the plow.

It has been recognized that it is highly desirable to provide apparatus for facilitating the covering over of trash on the ground when plowing takes place. To facilitate the turning over of trash, there is commonly utilized a colter ahead of the plow to sever the stalks and trash so that when the leading edge of the plowshare engages the soil that the trash may be turned under. Such apparatus designed to facilitate the turning under of trash is disclosed in my copending application, Serial Number 439,503, filed April 18, 1943, for farming implements which discloses a plow colter so constructed as to facilitate the severance of the trash and to tend to move the trash toward the furrow side a short distance so that the lead edge of the plow will not engage the severed trash. In order to further augment the action of such a plow colter, the present invention restrains the movement of trash during the time that the soil is engaged by the mold board of the plow. In accordance with the present invention a member is provided which tends to hold down the trash so that it will not climb over the soil and appear on top of the plowed field.

It therefore is an object of the present invention to provide an improved farming implement for insuring the covering over of trash or trashy soil being plowed.

It is another object of the present invention to provide an improved farming implement operating in cooperation with a plow colter and a plow for insuring the covering over of trash or trashy soil during plowing.

Still another object of the present invention is to provide an improved farming implement for use with either a plow or plow colter to insure covering over of trash during plowing.

Other and further objects of the present invention subsequently will become apparent by reference to the following description taken in connection with the accompanying drawing wherein Figure 1 is a perspective view of a plow and plow colter cooperating with the present invention during plowing to cover over trash appearing on the top of trashy soil; Figure 1a is a partial view of Figure 1 showing alternative fastening means;

Figure 2 is a plane view of the device of the present invention;

Figure 3 is a view along the line 3—3 in the direction of the arrows in Figure 1;

Figure 4 is a view along the line 4—4 in the direction of the arrows in Figure 1; and Figure 5 is a perspective view of the manner in which certain elements of the apparatus shown in Figure 2 are secured together.

Referring more particularly to Figure 1 there is shown a plow beam 11 secured to a plow having a plowshare 12 and a mold board 13. Attached by suitable brackets to the plow beam 11 is a plow colter 14 provided with a cleaning member 15 and having a general construction conforming to a plow colter and cleaning member described in my copending application. The plow colter 14 and the cleaning member 15 precede the leading edge of the plow so as to sever the trash appearing on the land side of the soil and to urge the trash away from the line of severance toward the furrow side.

While for the purpose of illustrating the application of the present invention, it has been found convenient to show the invention applied to an assembly comprising a mold board plow and a colter of the type described in my co-pending application, it is to be understood that the invention also may be used with colters of other types and also with other types of plows including a disk or rotary plow.

In accordance with the present invention a farming implement is provided for attachment ahead of the plow, and which may be attached either to the plow beam 11 as in Figure 1a or to a bracket 16 which forms a part of the colter 14 as in Figure 1. This apparatus includes a rod-like member 17 suitably mounted and shown in the drawing in Figure 1 as extending through an aperture in the member 16 and fastened on the other side thereof by a threaded portion 18 and lock nuts 19. The other end of the rod 17 has a threaded portion 21 provided with lock nuts 22 for retaining in position the sleeve portion 23 of an elongated sheet member 24. The elongated sheet member 24 comprises a trash shield having a generally trapezoidal configuration with an angular portion 25 located adjacent its free end on the furrow side. Adjacent the angular portion 25 there is secured a trail member 26 which may comprise a string, line, cord, rope, thong, strap, wire or chain. The sleeve portion 23 of the sheet member 24 may be formed by stitching, riveting, or other suitable fastening as indicated at 27. The trash shield 24 may be formed of any suitable flexible, semi-flexible or rigid material which will have reasonable good wearing qualities so as to withstand the abrasion caused by contact with the trashy top surface of the soil being plowed. Preferably the shield is made of a flexible material such as canvas, rubber, leather, synthetic resin or the like. The support member 17 is so positioned with respect to the bracket 16 or the plow beam 11 as to be in a generally horizontal direction extending toward the furrow side. The support member 17 is preferably positioned in the proximity of the plow beam so as to be somewhat above the height of the plow colter or the top of the mold board of the plow so that no trash may become lodged thereon or between the support member and the plow beam. The member 24 trailing therefrom extends rearwardly at an angle to the top surface of the soil so that all trashy matter may be engaged thereby and retained thereunder until the mold board of the plow turns over the sod. The trail member 26 is so arranged as to be engaged by the turned over soil so that a certain amount of tension is applied to the free end of the member 24 particularly along the furrow side edge.

The view of Figures 3 and 4 serves to illustrate the manner in which the member 24 operates to insure the covering over of trash on the top surface of the soil being plowed. From Figure 3 it will be seen that the plow comprising the plow share and the mold board 13 is lifting up soil from the land side 27 and turning it over toward the furrow 28. It will be seen that the trash shield 24 is retaining in position the trash 29 so that the trash has to move downwardly toward the furrow 28 and does not climb out or scatter out of position due to the movement of the soil being turned over by the plow. Figure 4 is a view just in back of the plow and shows how the trash 29 has been completely covered over by soil and also illustrates how the trail member 26 is covered over with soil so as to apply tension to the trash shield 24. This arrangement therefore insures the complete covering over of trash such as corn stalks, soy beans, English and sweet clover and the like which frequently are difficult to turn over.

While a particular embodiment of the invention has been disclosed, it is to be understood that the invention is not to be limited thereby since obviously such variations and alterations may be made therein as are commensurate with the spirit and scope of the invention as set forth in the appended claims.

This invention is hereby claimed as follows:

1. An accessory for a plow having a mold board comprising a strip of sheet material having a width at least equal to a substantial portion of the width of a furrow, and means for supporting said strip under tension from a point appreciably ahead of the plow to a point in the proximity of the mold board of the plow.

2. A device for use with a plow having a plow beam, comprising a support adapted to be fixedly mounted transversely to the plow beam ahead of the plow so as to extend in a generally horizontal direction toward the furrow side, an elongated member of sheet material supported at one end by said support, and means attached to the other end of said sheet member and adapted to be engaged by the soil being turned over by the plow for applying tension to said member.

3. A trash covering device for use with a plow having a plow beam comprising a rigid support adapted to be mounted fixedly transversely with respect to said plow beam ahead of the plow so as to extend in a generally horizontal direction toward the furrow side, an elongated strip member of sheet material supported at least at one end by said support and extending rearwardly to the proximity of the plow, and trail means of appreciable length and relatively small cross-sectional dimensions attached to the other end of said sheet strip member and adapted to be engaged by the soil being turned over by the plow.

4. A trash shield to insure the covering of trash by plowing comprising a rigid support member adapted to be mounted fixedly in horizontal position from a plow beam ahead of the plow, an elongated trapezoidally shaped strip of sheet material supported at one end from said support member, said strip of sheet material having the other end tapered toward the furrow side, and a trail member attached to said tapered end adjacent the furrow side and adapted to be engaged by the soil being turned over by the plow thereby to cause a tension force to be applied to said strip.

5. A trash shield to insure the plowing under of trash comprising a rigid support member adapted to be mounted fixedly in a horizontal position with respect to a plow beam ahead of the plow, an elongated trapezoidally shaped strip of sheet material having parallel sides and being supported at one end from said support member so as to extend rearwardly toward the plow, said strip of sheet material having the other end tapered toward the furrow side, and an elongated trail member of small cross-sectional dimensions attached adjacent said tapered end on the furrow side thereof and adapted to be engaged by the soil being turned over by the plow.

6. The combination comprising a mold board plow having a plow beam, a colter mounted on said plow beam ahead of said plow to sever trash on the surface of the soil to be plowed and means supported on the furrow side of said plow beam ahead of said plow and to one side of said colter for assisting said plow to completely cover said trash, said means comprising a support member mounted fixedly relative to said plow beam and extending in a generally horizontal position transversely of said plow beam, a strip of sheet material attached to said support member and extending to the proximity of the mold board of said plow, said strip having substantially parallel sides and a diagonal edge adjacent said mold board, and a relatively long trail member of small cross-sectional dimensions attached to the end of said strip adjacent the furrow side, said trail member being arranged to be engaged by the soil being turned over by the mold board of said plow.

7. The combination comprising a mold board plow having a plow beam, a colter mounted upon a bracket connected to said plow beam to sever trash on the surface of the soil to be plowed, a cleaning and spreading member for said colter supported from said bracket, and means carried by said bracket on the furrow side and extending alongside said colter toward said mold board plow for assisting in the covering over of said trash during plowing, said means comprising a support member mounted on said bracket in a transverse horizontal position on said bracket relative to said plow beam, a strip of sheet material atttached to said support member and extending to the proximity of said mold board, said strip having substantially parallel sides and a diagonal edge in the proximity of said mold board, and an elongated flexible trail member of relatively small diameter attached to the end of said strip adjacent the furrow side, said trail member being adapted to be engaged by the soil being turned over by said plow.

8. A trash shield to insure the plowing under of trash comprising a rigid support member adapted to be mounted fixedly in a horizontal position with respect to a plow beam ahead of the plow, an elongated trapezoidally shaped strip of flexible material having parallel sides and being supported at one end from said support so as to extend rearwardly toward the plow, said strip having the other end tapered toward the furrow side, and an elongated flexible trail member of small diameter attached adjacent said tapered end on the furrow side thereof and adapted to be engaged by the soil being turned over by the plow.

9. The combination comprising a mold board plow having a plow beam, a colter mounted on said plow beam ahead of said plow to sever trash on the surface of the soil to be plowed, and means supported on the furrow side of said plow beam ahead of said plow and alongside of said colter for assisting said plow to completely cover said trash, said means comprising a support member mounted from the plow beam so as to extend in a generally horizontal position transversely of said plow beam, a strip of flexible material attached to said support member and extending to the proximity of the mold board of said plow, said strip having substantially parallel sides and a diagonal edge adjacent said mold board, and a trail member of flexible material relatively long and of small diameter attached to the end of said strip adjacent the furrow side, said trail member being adapted to be engaged by the soil being turned over by the mold board of said plow.

OAKLEY D. LUTES.